United States Patent
Zhang et al.

(10) Patent No.: US 12,242,048 B2
(45) Date of Patent: Mar. 4, 2025

(54) BILAYER PHOTONIC CRYSTAL PHOTOSWITCH THIN-FILM DEVICE AND PREPARATION METHOD THEREOF

(71) Applicant: DALIAN UNIVERSITY OF TECHNOLOGY, Liaoning (CN)

(72) Inventors: Shufen Zhang, Liaoning (CN); Yong Qi, Liaoning (CN); Wenbin Niu, Liaoning (CN); Suli Wu, Liaoning (CN); Wei Ma, Liaoning (CN); Bingtao Tang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 494 days.

(21) Appl. No.: 17/756,714

(22) PCT Filed: Sep. 8, 2020

(86) PCT No.: PCT/CN2020/113933
§ 371 (c)(1),
(2) Date: May 31, 2022

(87) PCT Pub. No.: WO2021/103738
PCT Pub. Date: Jun. 3, 2021

(65) Prior Publication Data
US 2023/0003993 A1    Jan. 5, 2023

(30) Foreign Application Priority Data
Nov. 29, 2019   (CN) .......................... 201911207282.1

(51) Int. Cl.
| | |
|---|---|
| *G02B 26/00* | (2006.01) |
| *C08F 222/10* | (2006.01) |
| *C08J 5/18* | (2006.01) |
| *G02B 1/00* | (2006.01) |

(52) U.S. Cl.
CPC ........ *G02B 26/007* (2013.01); *C08F 222/103* (2020.02); *C08J 5/18* (2013.01);
(Continued)

(58) Field of Classification Search
None
See application file for complete search history.

(56) References Cited

U.S. PATENT DOCUMENTS

| | | |
|---|---|---|
| 2004/0062505 A1 | 4/2004 | Sugitatsu et al. |
| 2014/0255040 A1 | 9/2014 | Fujita et al. |

FOREIGN PATENT DOCUMENTS

| | | |
|---|---|---|
| CN | 101655611 A | 2/2010 |
| CN | 102701226 A | 10/2012 |

(Continued)

OTHER PUBLICATIONS

Qi, Yong et al.; "Encoding and Decoding of Invisible Complex Information in a Dual-Response Bilayer Photonic Crystal with Tunable Wettability"; Advanced Functional Materials; vol. 29; Sep. 18, 2019; ISSN:1616-301X; pp. 1906799(1-11).

(Continued)

*Primary Examiner* — Shan Liu
(74) *Attorney, Agent, or Firm* — Allen Xue; NKL Law

(57) ABSTRACT

A bilayer photonic crystal photoswitch thin-film device having the optical characteristics of both 2D and 3D photonic crystals, and a preparation method thereof are provided. When the bilayer photonic crystal photoswitch thin-film device is rotated periodically, different colors can be observed at a fixed rotation angle, that is, the device has the attribute of changing colors by means of rotation, and can thus realize the opening and closing of an optical path. The bilayer photonic crystal photoswitch thin-film new device has broad application prospects in the fields of photo- (Continued)

switches, optical waveguides, optical prisms, warming signs, anti-counterfeiting and information coding, etc.

10 Claims, 12 Drawing Sheets

(52) U.S. Cl.
CPC ............ *G02B 1/005* (2013.01); *C08J 2335/02* (2013.01); *G02F 2202/32* (2013.01)

(56) References Cited

FOREIGN PATENT DOCUMENTS

| CN | 103409801 A | | 11/2013 | |
|---|---|---|---|---|
| CN | 103616773 A | | 3/2014 | |
| CN | 106905551 A | | 6/2017 | |
| CN | 108254807 A | | 7/2018 | |
| CN | 108802861 A | * | 11/2018 | ............ G02B 1/005 |
| CN | 108948394 A | * | 12/2018 | |
| CN | 109021481 A | | 12/2018 | |
| CN | 110780361 A | | 2/2020 | |
| CN | 111025431 A | | 4/2020 | |
| JP | 5596825 B1 | | 9/2014 | |
| KR | 20140016006 A | | 2/2014 | |

OTHER PUBLICATIONS

Kim, Jong Bin et al.; "Designing Structural-Color Patterns Composed of Colloidal Arrays"; ACS Applied Materials and Interfaces, 2019, vol. 11, No. 16, pp. 14485-14509.

Lee, Hye Soo et al.; "Colloidal Photonic Crystals toward Structural Color Palettes for Security Materials", Chemistry of Materials; 2013, vol. 25, No. 13; pp. 2684-2690.

Ito, Masateru M. et al.; "Structural colour using organized microfibrillation in glassy polymer films", Nature; Jun. 20, 2019, vol. 570; pp. 363-367.

Li, Zhiwei et al.; "Magnetic Assembly of Nanocubes for Orientation-Dependent Photonic Responses"; American Chemical society, Nano Lett.; 2019, vol. 19, No. 9; pp. 6673-6680.

Lv, Jiawei et al.; "Biomimetic Chiral Photonic Crystals"; Angewandte Chemie, International Edition; 2019, vol. 58, No. 23; pp. 7783-7787.

Wang, Meng et al.; "Bias-Polarity Dependent Bidirectional Modulation of Photonic Bandgap in a Nanoengineered 3D Blue Phase Polymer Scaffold for Tunable Laser Application"; Advanced Optical Materials; 2018; vol. 6, No. 16; pp. 1800409, 1-8.

Yu, Shuzhen et al.; "Large-Area and Water Rewriteable Photonic Crystal Films Obtained by the Thermal Assisted Air-Liquid Interface Self Assembly"; ACS Applied Materials & Interfaces; 2019, vol. 11, No. 25; pp. 22777-22785.

Wang, Ke et al.; "A facile fabrication strategy for anisotropic photonic crystals using deformable spherical nanoparticles"; Nanoscale; 2019; vol. 11; pp. 14147-14154.

Qi, Yong et al.; "New Encryption Strategy of Photonic Crystals with Bilayer Inverse Heterostructure Guided from Transparency Response"; Advanced Functional Materials; 2019; vol. 29; pp. 1903743(1-11).

Meng, Yao et al.; "Biomimetic Structural Color Films with a Bilayer Inverse Heterostructure for Anticounterfeiting Applications"; ACS Applied Materials & Interfaces; Oct. 22, 2018; vol. 10; pp. 38459-38465.

\* cited by examiner

BILAYER PHOTONIC CRYSTAL PHOTOSWITCH THIN-FILM DEVICE AND PREPARATION METHOD THEREOF

TECHNICAL FIELD

The present disclosure relates to a bilayer photonic crystal photoswitch thin-film device, in particular to a bilayer 3D photonic crystal thin-film having two periodic reproducibility 2D photonic band gaps of 30° and 60°.

BACKGROUND

Necessary optical manipulation in photonic is especially important for the development of intelligent optical devices. The color transformation of most photonic crystals depends on the blue (or red) shift (J. B. Kim, S.-H. Kim, et al. Designing Structural-Color Patterns Composed of Colloidal Arrays [J]. ACS Appl. Mater. Interfaces, 2019, 11(16): 14485-14509), superposition (H. S. Lee, T. S. Shim, et al. Colloidal Photonic Crystals toward Structural Color Palettes for Security Materials [J]. Chem. Mater. 2013, 25(13): 2684-2690), or environmental stimulated formation of photonic bandgap (M. M. Ito, A. H. Gibbons, et al. Structural colour using organized microfibrillation in glassy polymer films [J]. Nature 2019, 570: 363-367). In specular reflection mode, these band gaps change with the expansion, contraction or formation of polymer micropores, which often requires the stimulation response of external environmental conditions (such as light, temperature, solvent, steam and pH). These devices require that the polymers used thereof have a single characteristic or special function, such as humidity response, temperature response, steam response, pressure response, light response or solvent response, and should not be too sensitive. Although such devices can meet the optical path manipulation under the stimulation of environmental conditions, but are not suitable for the optical manipulation without the above changes in environmental conditions (under the stimulation of non-environmental conditions), nor can achieve the optical manipulation under the non-specular reflection mode.

Besides, the optical path can also be manipulated by means of controlling the assembly mode, and regulating the spatial arrangement of the nanoparticles to change the lattice spacing. Such as magnetic assembly (Z. Li, M. Wang, et al. Magnetic Assembly of Nanocubes for Orientation-Dependent Photonic Responses [J]. Nano Lett. 2019, 19(9): 6673-6680) and Langmuir-Schaefer assembly (J. Lv, D. Ding, et al. Biomimetic Chiral Photonic Crystals [J]. Angew. Chem., Int. Ed. 2019, 58(23): 7783-7787). However, a special assembly limits the band gap of photonic crystal and the process thereof is complex, which makes the reflected light of the device excessively undiversified. Some physical conversion methods have also been used to regulate the photonic band gap, including polymer scaffold (M. Wang, C. Zou, et al. Bias-Polarity Dependent Bidirectional Modulation of Photonic Bandgap in a Nanoengineered 3D Blue Phase Polymer Scaffold for Tunable Laser Application[J]. Adv. Optical Mater. 2018, 6(16): 1800409), glass transition (S. Yu, X. Cao, et al. Large-Area and Water Rewriteable Photonic Crystal Films Obtained by the Thermal Assisted Air-Liquid Interface Self Assembly [J]. ACS Appl. Mater. Interfaces 2019, 11(25): 22777-22785) and deformable spherical nanoparticles (K. Wang, C. Li, et al. A facile fabrication strategy for anisotropic photonic crystals using deformable spherical nanoparticles [J]. Nanoscale 2019, 11: 14147-14154). These physical methods are usually based on 2D photonic crystals or 3D photonic crystals, and the obtained photonic band gap is continuous, which can only change the color of light, but the optical path does not have the characteristic of periodic opening and closing. And, the preparation of these nanoparticles needs to consider the surface charge, degree of hardness and softness (glass transition temperature) and stimulated deformation ability. For 2D photonic crystals, the assembly of monolayer nanospheres is much more difficult than that of 3D photonic crystals; and only specular reflection can realize the regulation of the optical path for 3D photonic crystals. In conclusion, the traditional way to induce the change of photonic band gap often requires the stimulation of external environmental conditions, and the preparation process of nanoparticles is complex and the optical path is single and continuous, which greatly limits the practical application of traditional photonic crystal devices.

Recently, a reversible conversion between polychromatic light (two band gaps) and monochromatic light (one band gap) was realized by transparentizing the top layer of bilayer photonic crystal via refractive index matching (Y. Qi, L. Chu, et al. New Encryption Strategy of Photonic Crystals with Bilayer Inverse Heterostructure Guided from Transparency Response [J]. Adv. Funct. Mater. 2019, 29: 1903743). Research of the bilayer photonic crystals has attracted wide attention (Y. Qi, W. Niu, et al. Encoding and Decoding of Invisible Complex Information in a Dual-Response Bilayer Photonic Crystal with Tunable Wettability [J]. Adv. Funct. Mater. 2019, 29:1906799; Y. Meng, J. Qiu, et al. Biomimetic Structural Color Films with a Bilayer Inverse Heterostructure for Anticounterfeiting Applications [J]. ACS Appl. Mater. Interfaces 2018, 10, 38459-38465). This kind of bilayer photonic crystals can obtain a variety of band gaps by means of only changing the angle or environmental stimulation without using complex nanoparticles. Compared with traditional photonic crystals, the bilayer photonic crystals have more regulatory sites and more complex color conversion characteristics. Even so, the reported bilayer photonic crystals at present still depend on the specular reflection of photonic crystals, the reflected light only changes in color, and cannot break or deflect the optical path. Therefore, it is still a major challenge to develop simpler band gap regulation method.

SUMMARY OF THE INVENTION

It is an object of the present invention to provide a bilayer photonic crystal photoswitch thin-film device having the optical characteristics of both 2D and 3D photonic crystals, and a preparation method thereof. When the bilayer photonic crystal photoswitch thin-film device is rotated periodically, different colors can be observed at a fixed rotation angle, that is, it has the property of rotatable color change, thereby realizing the opening and closing of the optical path.

A bilayer photonic crystal photoswitch thin-film device includes two opal photonic crystal templates with different thicknesses and a flexible polymer thin-film material, wherein the templates are assembled by nanospheres and combined into a "sandwich" structure by perpendicular dislocation. The flexible polymer thin-film material is prepared by copolymerization of a precursor solution under an action of ultraviolet light, wherein the precursor solution is prepared by acrylic acid and esters thereof, mercapto acrylates and photoinitiator. By rotating the bilayer photonic crystal photoswitch thin-film along a horizontal direction of the bilayer photonic crystal photoswitch thin-film, the opening and closing of two periodically controllable optical paths of 30° and 60° are realized.

In some embodiments, preferably, the two nanosphere opal photonic crystal templates have different thicknesses. The thickness of one template is less than 2 μm and the thickness of the other template is more than 2 μm, then the boundary value of the two is 2 μm. However, the boundary value of the thickness is not limited to 2 According to the particle size of the nanospheres used, the boundary value can fluctuate. A general fluctuation range of the boundary value is 1 to 6 μm.

In some embodiments, a preferable particle size of the nanosphere ranges from 250 to 550 nm, and more preferably ranges from 350 to 450 nm.

In some embodiments, preferably, the nanospheres are silicon dioxide, titanium dioxide, polystyrene coated with silicon dioxide or titanium dioxide, polymethylmethacrylate coated with silicon dioxide or titanium dioxide, poly (styrene-methyl methacrylate-acrylic acid) polymer colloidal nanospheres coated with silicon dioxide or titanium dioxide, titanium dioxide coated with silicon dioxide, silicon dioxide coated with titanium dioxide, chromic oxide or zinc oxide.

In some embodiments, preferably, the opal photonic crystal template is obtained by pulling and assembling the nanospheres.

In some embodiments, preferably, the acrylic acid and the esters thereof include triacrylates, diacrylates or acrylic acids. A volume ratio of the triacrylates, diacrylates and acrylic acids is (0.1 to 6):(0.1 to 6):(0.1 to 6).

In some embodiments, preferably, the triacrylates is one of ethoxylated trimethylolpropane triacrylate, trimethylolpropane triacrylate and pentaerythritol triacrylate.

In some embodiments, preferably, the diacrylates is one or two of poly(ethylene glycol) (200) diacrylate, poly(ethylene glycol) (400) diacrylate, poly(ethylene glycol) (600) diacrylate and poly(ethylene glycol) (1000) diacrylate.

In some embodiments, preferably, the mercaptoacrylates, as a modifier, is selected from one of tetra(3-mercaptopropionic acid) esters, tris(3-mercaptopropionic acid) esters and di(3-mercaptopropionic acid) esters. And the volume ratio of the mercaptoacrylates modifier to the triacrylate ranges from 0.1 to 1:1.

In some embodiments, preferably, the mercaptoacrylates is selected from one of tetra(3-mercaptopropionic acid) pentaerythritol ester, trimethylolpropane tri(3-mercaptopropionic acid) ester, tri(3-mercaptopropionic acid) glycerol ester and di(3-mercaptopropionic acid) ethylene glycol ester.

In some embodiments, preferably, the photoinitiator is selected from one or two of 2-hydroxy-2-methyl-1-phenyl-1-acetone (1173), 1-hydroxy-cyclohexyl phenyl acetone (184), 2-methyl-1-(4-methylthiphenyl)-2-morpholine-1-acetone (907), 2-benzyl-2-dimethylamino-1-(4-morpholine phenyl) butanone (369), phenyl bis(2,4,6-trimethylbenzoyl) phosphonic oxide (819), benzoin dimethyl ether, and benzoin ethyl ether. The volume ratio of the photoinitiator to the triacrylate is (0.01 to 0.05):1.

The present disclosure also provides a method for preparing the bilayer photonic crystal photoswitch thin-film device. Firstly, the nanosphere opal templates having a particle size of 250 to 550 nm are obtained by pulling and self-assembly, and then two templates having different thicknesses are combined by perpendicular dislocation into a "sandwich" structure which is filled with precursor solution of acrylic acid and the esters thereof, mercaptoacrylates, and photoinitiator, etc.; finally, the bilayer 3D photonic crystal is obtained by ultraviolet curing the filled "sandwich" structure. The method includes the following steps of:

S1. preparing, at room temperature, nanosphere opal photonic crystal templates having a particle size of 250 to 500 nm by pulling and self-assembly. The thickness of the template thickens with the increase of the number of pulling cycles.

S2. combining, in dislocation manner by 90°, two nanosphere opal photonic crystal templates with different thicknesses, and separating the two templates by a polyimide tape to form a "sandwich" structure;

S3. mixing the triacrylates, diacrylates, acrylic acids, mercaptoacrylates, and photoinitiator, and perfusing, after ultrasonic dispersion uniformly, the mixture into the templates of the "sandwich" structure obtained in step S2 for ultraviolet light curing; and S4. stripping the outside glass substrates to obtain a bilayer photonic crystal containing nanospheres.

In some embodiments, preferably, the nanospheres in the bilayer photonic crystal containing them obtained in the Step S4 can be retained or removed.

In some embodiments, preferably, the bilayer photonic crystal is immersed in hydrofluoric acid to remove the nanospheres.

In some embodiments, preferably, in step S1, the nanosphere opal photonic crystal template can further mechanical engraved to obtain a patterned template.

In some embodiments, preferably, in step S3, the ultraviolet light curing conditions are as follows: the power is 500 to 1000 W, the curing time is 10 to 120 seconds, and the ultraviolet lamp used for curing is a high-pressure mercury lamp.

The whole process of the present disclosure is operated at room temperature and the conditions are mild, which will not limit the substrate. The method of the present disclosure has wide applicability.

The bilayer photonic crystal photoswitch thin-film new devices of the present disclosure can be used as photoswitch, optical waveguide, optical prism, warning sign, anti-counterfeiting and information coding material.

Beneficial Effects of the Present Disclosure

The present disclosure uses a flexible polymer thin-film and nanospheres having a particle size of 250 to 550 nm to prepare a bilayer 3D photonic crystal having 2D optical characteristics. The preparation method of the present disclosure is simple in process and mild in conditions. The obtained bilayer photonic crystal photoswitch thin-film device has good flexibility and will never fade. The thin-film also has the angle dependence of 2D photonic crystals. Rotating the bilayer photonic crystal can obtain multicolour pattern with periodic reproducibility. Rich color changes can be achieved by changing the light source or viewing angle. The opening and closing of the optical path can be realized without external environmental stimulation, and the diffraction band covering the all visible spectrum can be obtained under the condition of non-specular reflection. The diffraction bands are discontinuous with periodic reproducibility of 30° and 60°. So long as rotating the bilayer photonic crystal thin-film, the opening and closing of six directional periodic optical paths can be realized on the side of the light source. The prepared polymer material of the present disclosure has good flexibility, which is suitable for various curved surface devices. The prepared polymer material is also suitable for surface modification for various substrates, such as glass, metal, ceramics, various synthetic resin substrates, etc. The thin-film has low preparation cost, simple operation, green environmental protection and good universality, which is of great significance to promote the practical application of photonic crystals.

DETAILED DESCRIPTION OF DRAWINGS

FIG. 1 shows, from left to right, the preparation flow diagram of the bilayer photonic crystal thin-film device in embodiment 1, which is also applicable to all embodiments.

FIG. 2 shows, from left to right, in Embodiment 1, the SEM top view of the silicon dioxide nanosphere template of about 283 nm, SEM top view of the inverse opal, and a 2D reflection spectrum (when the incident angle is 57.5° and the angle between the detector and the light source is 10°) and the corresponding digital photo (illustration). The thin-film in the digital photo is blue and the scale is 1 cm.

FIG. 3 shows, from left to right, in Embodiment 2, the SEM top view of the silicon dioxide nanosphere template of about 350 nm, SEM top view of the inverse opal, and a 2D reflection spectrum (when the incident angle is 57.5° and the angle between the detector and the light source is 10°) and the corresponding digital photo (illustration). The thin-film in the digital photo is green and the scale is 1 cm.

FIG. 4 shows, from left to right, in Embodiment 3, the SEM top view of the silicon dioxide nanosphere template of about 395 nm, SEM top view of the inverse opal, and a 2D reflection spectrum (when the incident angle is 57.5° and the angle between the detector and the light source is 10°) and the corresponding digital photo (illustration). The thin-film in the digital photo is orange and the scale is 1 cm.

FIG. 5 shows, used in Embodiment 4, the SEM top view of the silicon dioxide nanosphere template of about 441 nm, SEM top view of the inverse opal, and a 2D reflection spectrum (when the incident angle is 57.5° and the angle between the detector and the light source is 10°) and the corresponding digital photo (illustration). The thin-film in the digital photo is red and the scale is 1 cm.

FIG. 6a shows, when observed from the thinner side of the bilayer photonic crystal thin-film in Embodiment 3, a variation spectrogram of 2D photonic band gap during the rotation of the bilayer photonic crystal thin-film along the thin-film plane for one cycle. FIG. 6b shows, when observed from the thicker side of the bilayer photonic crystal thin-film in Embodiment 3, a variation spectrogram of 2D photonic band gap during the rotation of the bilayer photonic crystal thin-film along the thin-film plane for one cycle.

FIG. 7a shows a tensile strain curve of the bilayer photonic crystal thin-film in Embodiment 3. FIG. 7b shows the spectral test experiment results of the bilayer photonic crystal thin-film in Embodiment 3 after 300 times of bending, and the bending experiment result shows that the structural color of the thin-film has good stability.

FIG. 8a shows a 2D diffraction image of the inverse opal when observed from the thicker side of the bilayer photonic crystal thin-film in Embodiment 3. FIG. 8b shows a 2D diffraction image obtained by the bilayer inverse opal photonic crystal thin-film rotating by 30° along the thin-film plane under the condition of FIG. 8a. FIG. 8c shows a 2D diffraction image of the inverse opal when observed from the thinner side of the bilayer photonic crystal film in Embodiment 3. FIG. 8d shows a 2D diffraction image obtained by the bilayer inverse opal photonic crystal thin-film rotating by 30° along the thin-film plane under the condition of FIG. 8c.

FIG. 9a shows the SEM cross-sectional views of the inverse opal corresponding to the bilayer inverse opal photonic crystal template A in Embodiment 3, Embodiment 9, Embodiment 10 and comparative Example 2, and the SEM cross-sectional views of the inverse opal corresponding to the bilayer inverse opal photonic crystal templates A and B in comparative Example 3. FIG. 9b shows a SEM cross-sectional view of the inverse opal corresponding to the bilayer inverse opal photonic crystal template A in Embodiment 3 and Embodiment 9. FIG. 9c shows a SEM cross-sectional view of the inverse opal corresponding to the bilayer inverse opal photonic crystal template B in Embodiment 10.

FIG. 10 shows the digital photos of the patterned silicon dioxide template in Embodiment 4 with the change of incident angle. The light source and the camera are in the same position, and the incident angles are 30°, 35°, 40°, 45°, 50°, 55°, 60° and 65° respectively. The photos show a change in structural color from blue to red.

FIG. 11 shows, when observed from the thicker side of the bilayer photonic crystal thin-film containing titanium dioxide nanospheres in Embodiment 5, a variation spectrogram of 2D photonic band gap during the rotation of the bilayer photonic crystal along the thin-film plane for one cycle.

FIG. 12a shows a digital photo of the bilayer photonic crystal thin-film rotating by 90° when observed from the thinner side of the bilayer photonic crystal thin-film in Embodiment 9. The light source and the camera are in the same position, the incident angle is about 50°, and the photo is taken by every 15°. FIG. 12b shows a digital photo of the bilayer photonic crystal thin-film rotating by 90° when observed from the thicker side of the bilayer photonic crystal thin-film in Embodiment 9. The light source is in the same position as the camera, the incident angle is about 50°, and the photo is taken by every 15°.

FIG. 13a shows, when observed from the thinner side of the bilayer photonic crystal thin-film, in Embodiment 9 and comparative examples 2 and 3 and Embodiment 10, a relationship between the 2D reflection spectrum of the bottom layer and the thickness of the bottom layer when the incident angle is 57.5° and the angle between the detector and the light source is 10°. FIG. 13b shows, when observed from the thicker side of the bilayer photonic crystal thin-film, in Embodiment 9 and comparative examples 2 and 3 and Embodiment 10, the relationship between the 2D reflection spectrum of the bottom layer and the thickness of the top layer when the incident angle is 57.5° and the angle between the detector and the light source is 10°.

DETAILED DESCRIPTION OF PREFERRED EMBODIMENTS

The following non-limiting embodiments may enable those skilled in the art to understand the present disclosure more comprehensively, but do not limit the present disclosure in any way.

The test methods described in the following embodiments are conventional methods unless otherwise specified. The reagents and materials are commercially obtained unless otherwise specified.

Embodiment 1

1. At room temperature, the silicon dioxide opal photonic crystal templates having a particle size of about 283 nm were prepared by pulling and self-assembly. One of the two used templates was pulled for one circulation, having a thickness of 1.26 μm (template B), and the other was pulled for two circulations, having a thickness of 2.11 μm (template A). The two templates were dislocated by 90° and combined, and the polyimide tape was used to separate the two templates into a "sandwich" structure for later use. The "sandwich" structure described here is a hollow structure formed by taping the polyimide tape on four edges of one side of the template and then taping the side taped with polyimide tape of the two templates together.

2. Ethoxylated trimethylolpropane triacrylate, poly(ethylene glycol) (600) diacrylate, acrylic acid, and tetra(3-mercaptopropionic acid) pentaerythritol ester were mixed at a volume ratio of 1:4:1:0.5, and the photoinitiator 2-hydroxy-2-methyl-1-phenyl-1-acetone (1173) was added, wherein the volume ratio of the photoinitiator to ethoxylated trimethylolpropane triacrylate was 0.04:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 30 s.

3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

FIG. 1 shows the preparation flow diagram of the bilayer photonic crystal thin-film device in embodiment 1, which is also applicable to all embodiments. The template A and the template B are perpendicularly dislocated by 90° and taped with polyimide tape to separate to form a "sandwich" structure. After perfusing the precursor solution into the "sandwich" structure, the bilayer photonic crystal thin-film containing nanospheres was obtained by ultraviolet curing.

FIG. 2 shows, from left to right, in embodiment 1, the SEM top view of the silicon dioxide nanosphere template, SEM top view of the inverse opal, and a 2D reflection spectrum (when the incident angle is 57.5° and the angle between the detector and the light source is 10°) and the corresponding digital photo (illustration). The scale of the digital photo is 1 cm. The particle size of the corresponding silicon dioxide is about 283 nm, the 2D reflection wavelength of the inverse opal under corresponding conditions is about 440 nm, and it shows blue under corresponding conditions.

Embodiment 2

1. At room temperature, the silicon dioxide opal photonic crystal templates having a particle size of about 350 nm were prepared by pulling and self-assembly. One of the used two templates was pulled for one circulation, having a thickness of 1.35 μm (template B), and the other was pulled for two circulations, having a thickness of 2.44 μm (template A). The two templates were dislocated by 90° and combined, and the polyimide tape was used to separate the two templates into a "sandwich" structure for later use.

2. Ethoxylated trimethylolpropane triacrylate, polye(thylene glycol) (400) diacrylate, acrylic acid, and tetra(3-mercaptopropionic acid) pentaerythritol ester were mixed at a volume ratio of 1:4:1:0.2, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the templates of the "sandwich" structure templates for ultraviolet light curing. The ultraviolet lamp used for curing is a high-pressure mercury lamp with a power of 1000 W and a curing time of 20 s.

3. The outside glass substrates were stripped to obtain the bilayer photonic photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

FIG. 3 shows, from left to right, in this Embodiment, the SEM top view of the silicon dioxide nanosphere template, SEM top view of the inverse opal, and a 2D reflection spectrum (when the incident angle is 57.5° and the angle between the detector and the light source is 10°) and the corresponding digital photo (illustration). The scale of the digital photo is 1 cm. The particle size of the corresponding silicon dioxide is about 350 nm, the 2D reflection wavelength of the inverse opal under corresponding conditions is about 525 nm, and it shows green under corresponding conditions.

Comparative Example 1

1. At room temperature, the silicon dioxide opal photonic crystal templates having a particle size of about 395 nm were prepared by pulling and self-assembly. One of the two used templates were pulled for one circulation, having a thickness of 1.24 μm (template B), the other was pulled for two circulations, with a thickness of 2.01 μm (template A). The two templates were dislocated by 90° and combined, and the polyimide tape was used to separate the two templates into a "sandwich" structure for later use.

2. Ethoxylated trimethylolpropane triacrylate, polye(thylene glycol) (200) diacrylate, and acrylic acid were mixed at a volume ratio of 1:4:1, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 800 W and a curing time of 15 s.

3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

When the light source is on the same side as the observer and the incident angle is 57.5°, the structural color of the bilayer photonic crystal is orange, and the structural color is the same as that in Embodiment 3.

Embodiment 3

1. At room temperature, the silicon dioxide opal photonic crystal templates having a particle size of about 395 nm were prepared by pulling and self-assembly. One of the two used templates were pulled for one circulation, having a thickness of 1.24 μm (template B), and the other was pulled for two circulations, having a thickness of 2.01 μm (template A). The two templates were dislocated by 90° and combined, and the polyimide tape was used to separate the two templates into a "sandwich" structure for later use.

2. Ethoxylated trimethylolpropane triacrylate, polye(thylene glycol) (200) diacrylate, acrylic acid, and tetra(3-mercaptopropionic acid) pentaerythritol ester were mixed at a volume ratio of 1:4:1:0.25, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 800 W and a curing time of 15 s.
3. The outside glass substrates on were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

FIG. 4 shows, from left to right, in Embodiment 3, the SEM top view of the silicon dioxide nanosphere template, SEM top view of the inverse opal, and a 2D reflection spectrum (when the incident angle is 57.5° and the angle between the detector and the light source is 10°) and the corresponding digital photo (illustration). The scale of the digital photo is 1 cm. The particle size of the corresponding silicon dioxide is about 395 nm, the 2D reflection wavelength of the inverse opal under corresponding conditions is about 590 nm, and it shows orange under corresponding conditions.

FIG. 6a shows a variation spectrogram of 2D photonic band gap during the rotation of the bilayer photonic crystal thin-film along the thin-film plane for one cycle when observed from the thinner side (template B) of the bilayer photonic crystal thin-film in this embodiment. The thin-film displays the structural color of the layer B when the bilayer photonic crystal rotates by 0°. The structural color changes from blue to red when the light source and the observer are in the same position and the incident angle increases from 30° to 65°. After the bilayer photonic crystal rotating by 30°, the structural color of layer B disappears and the thin-film displays the structural color of the layer A. The structural color changes from blue to red when the light source and the observer are in the same position and the incident angle increases from 30° to 65°. After the bilayer photonic crystal rotating by 30° again, the structural color of the layer A disappears and the thin-film displays the structural color of the layer B. For the whole bilayer photonic crystal, the opening-closing period of the structural color is 30°. FIG. 6b shows a variation spectrogram of 2D photonic band gap during the rotation of the bilayer photonic crystal thin-film along the thin-film plane for one cycle when observed from the thicker side (template A) of the bilayer photonic crystal thin-film in Embodiment 3. The thin-film displays the structural color of the layer A when the bilayer photonic crystal rotates by 0°. The structural color changes from blue to red when the light source and the observer are in the same position and the incident angle increases from 30° to 65°. After the bilayer photonic crystal rotating by 30°, the structural color of the layer A disappears and the structural color of the layer B cannot be observed. After the bilayer photonic crystal rotating by 30° again, the thin-film displays the structural color of the layer A, turning this cycle. For the whole bilayer photonic crystal, the opening-closing period of the structural color is 60°.

Figure 8A:
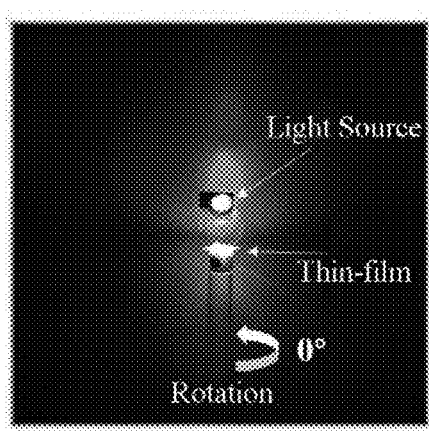
Figure 8B:
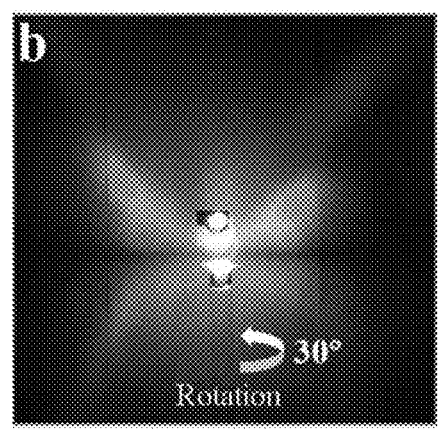
Figure 8C:
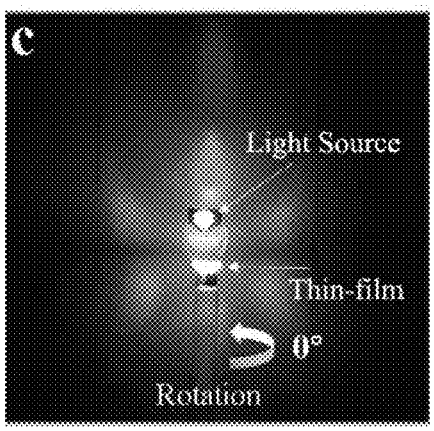
Figure 8D:
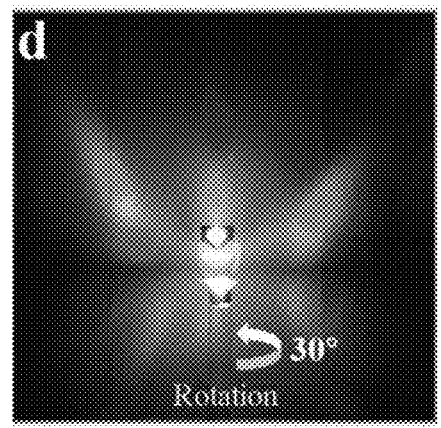

FIG. 8a is a 2D diffraction image of the inverse opal when observed from the thicker side (template A) of the bilayer photonic crystal thin-film in Embodiment 3. FIG. 8b shows a 2D diffraction image obtained by rotating the bilayer inverse opal photonic crystal thin-film by 30° along the thin-film plane under the condition of FIG. 8a. FIG. 8c shows a 2D diffraction image of the inverse opal when observed from the thinner side (template B) of the bilayer photonic crystal film in Embodiment 3. FIG. 8d shows a 2D diffraction image obtained by rotating the bilayer inverse opal photonic crystal thin-film by 30° along the thin-film plane under the condition of FIG. 8c. 2D optical imaging shows that rich color changes can also be achieved under non-specular reflection.

Figure 9A:
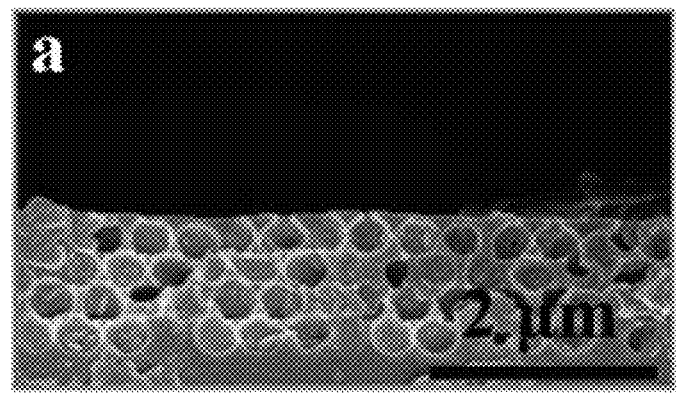
Figure 9B:
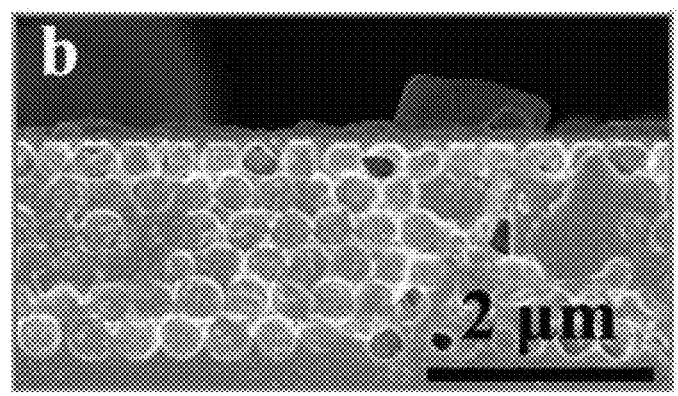

FIG. 9a shows the SEM cross-sectional view of the inverse opal (having a thickness of about 1.24 μm) corresponding to the bilayer inverse opal photonic crystal template A in embodiment 3. FIG. 9b shows a SEM cross-sectional view of the inverse opal (having a thickness of about 2.01 μm) corresponding to the bilayer inverse opal photonic crystal template B in embodiment 3.

Embodiment 4

1. At room temperature, the silicon dioxide opal photonic crystal templates having a particle size of about 411 nm were prepared by pulling and self-assembly. One of the two used templates was pulled for one circulation, having a thickness of 1.04 μm (template B), and the other template was pulled for two circulations, having a thickness of 2.19 μm (template A). The thicker template was mechanically engraved. The two templates were dislocated by 90° and combined, and the polyimide tape was used to separate the two templates into a "sandwich" structure for later use.
2. Ethoxylated trimethylolpropane triacrylate, poly(ethylene glycol) (1000) diacrylate, acrylic acid, and tetra(3-mercaptopropionic acid) pentaerythritol ester were mixed at a volume ratio of 1:4:1:0.4, and the photoinitiator 2-hydroxy-2-methyl-1-phenyl-1-acetone (1173) was added, wherein the volume ratio of the photoinitiator to ethoxylated trimethylolpropane triacrylate was 0.05:1. After ultrasonic dispersion uniformly, the mixture was perfused into the "sandwich" structure templates for ultraviolet light curing. The ultraviolet lamp used for curing is a high-pressure mercury lamp with a power of 500 W and a curing time of 60 s.
3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

Figure 5:
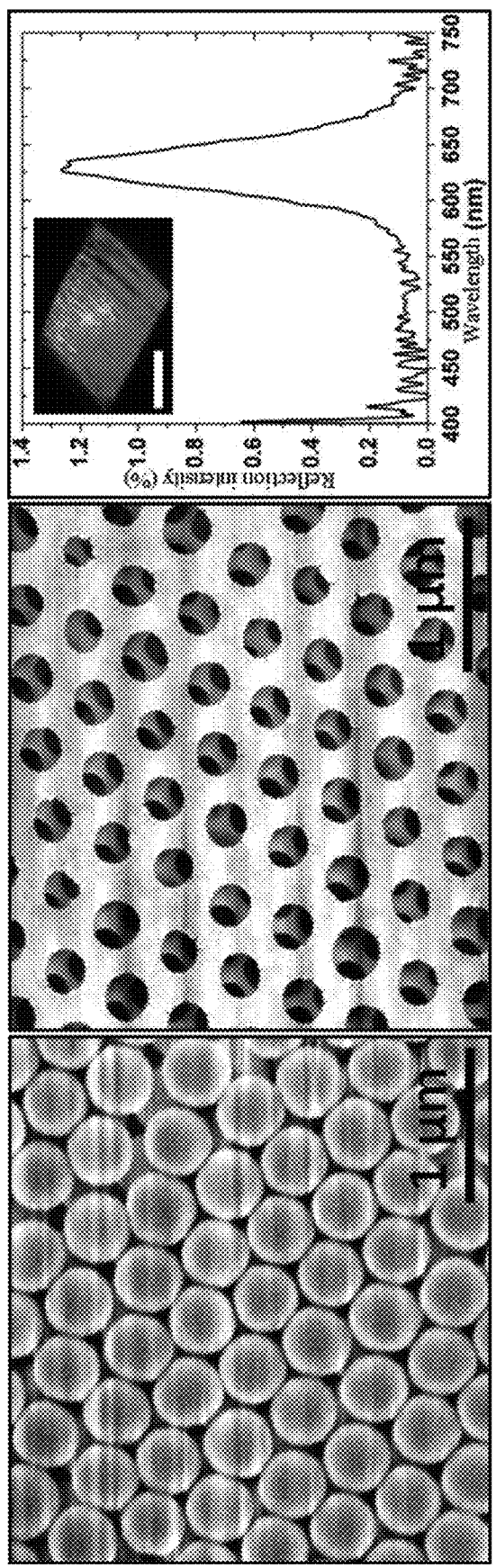
Figure 6A:
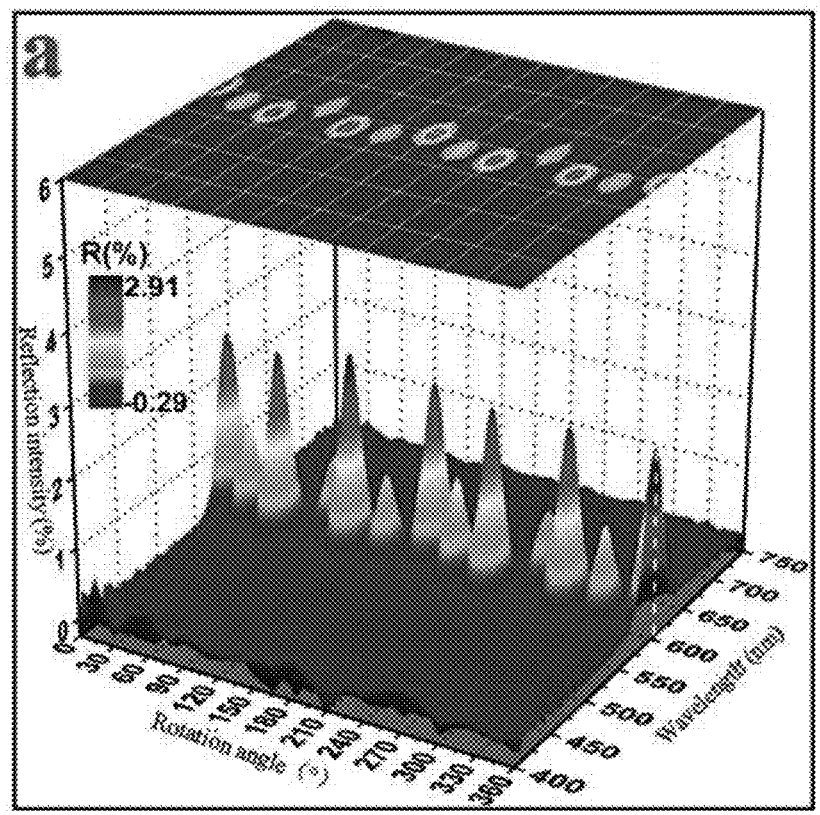
Figure 6B:
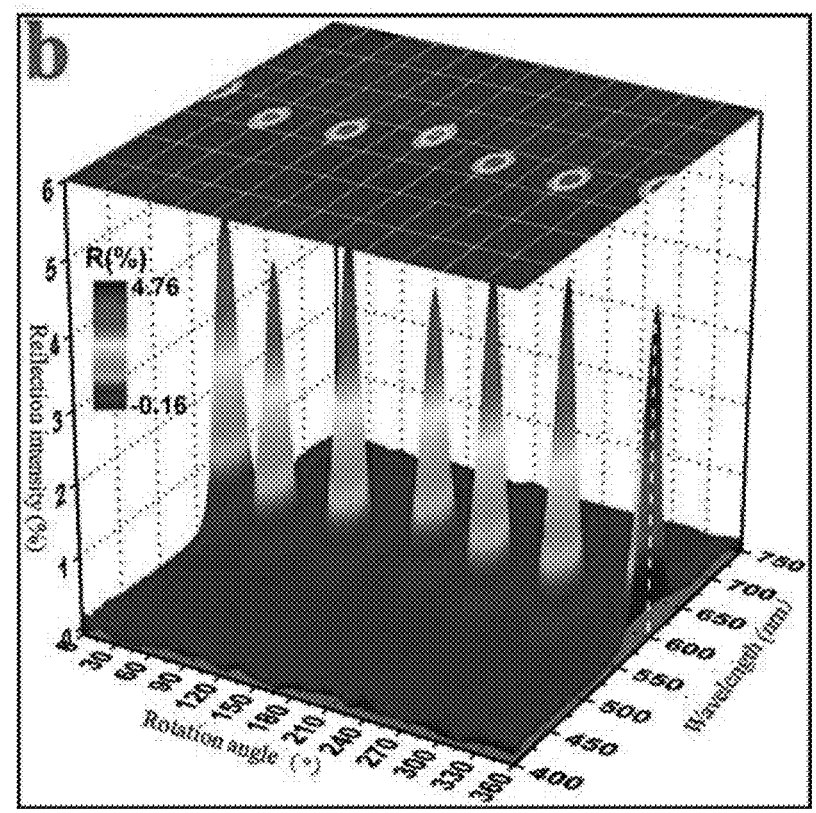
Figure 7A:
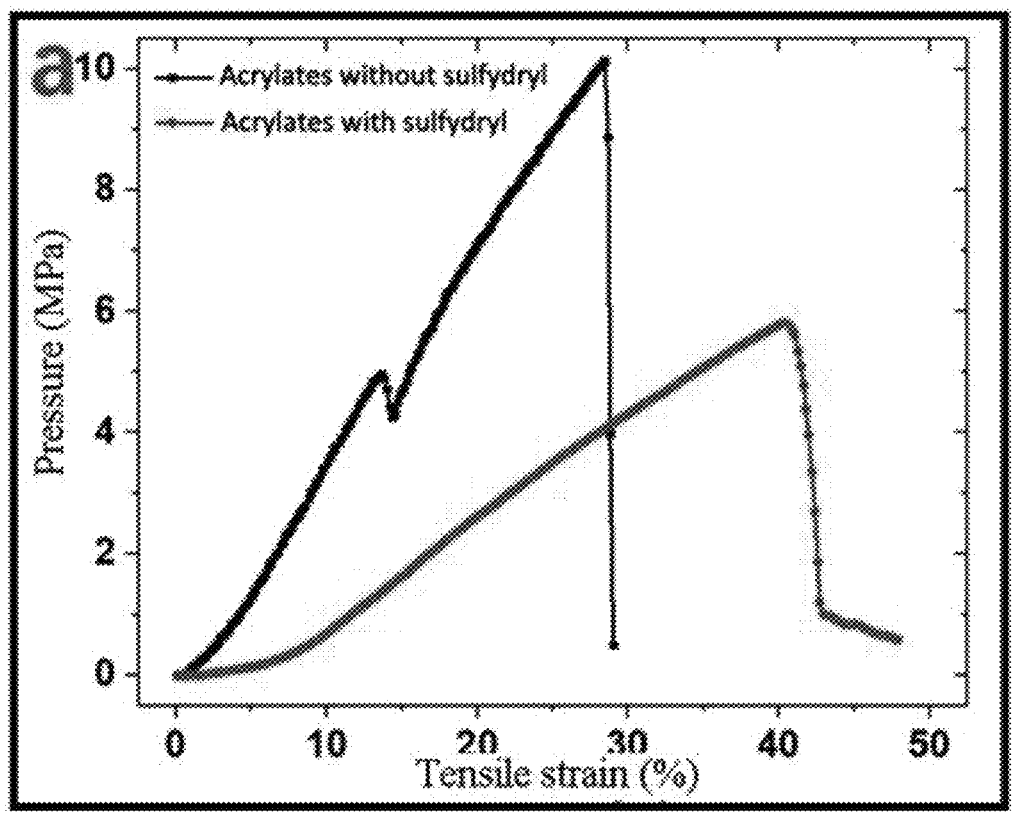
FIG. 7a shows a tensile strain curve of the bilayer photonic crystal thin-film in embodiment 3 and the Comparative Example 1. The tensile property of the polymer thin-film is significantly enhanced after adding mercaptoacrylates monomer.
Figure 7B:
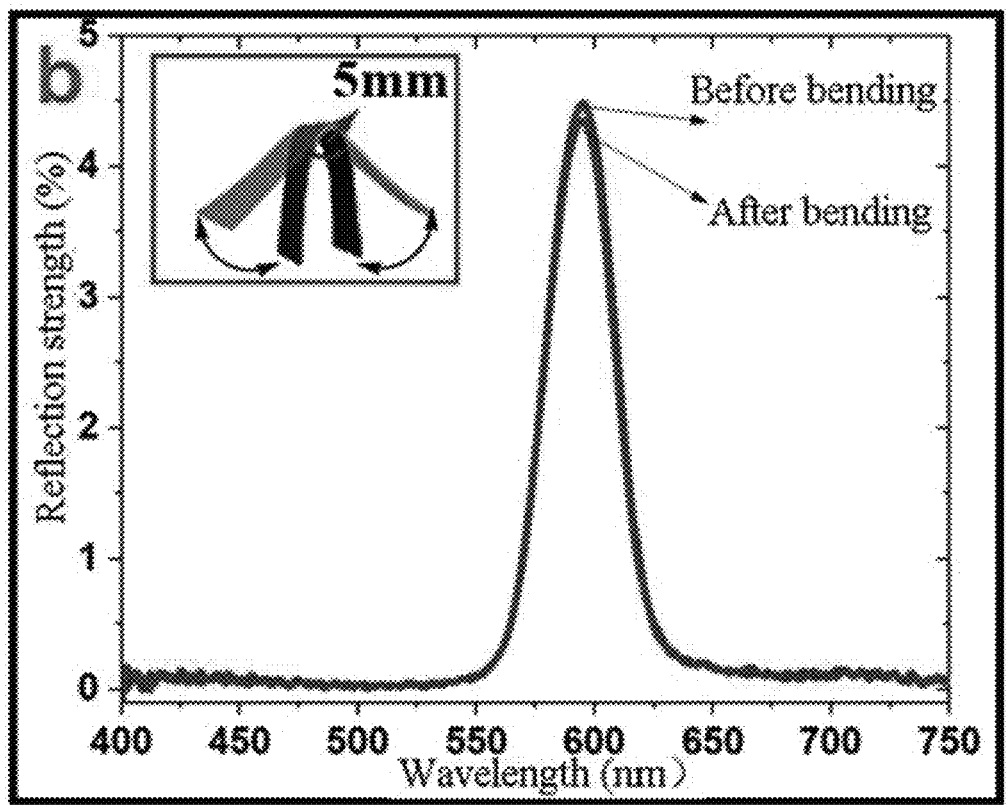
FIG. 7b shows the spectral test experiment results of the bilayer photonic crystal thin-film in embodiment 3 after 300 times of bending. The bending experiment result shows that the structural color of the thin-film has good stability.

FIG. 5 shows, in Embodiments 4, the SEM top view of the silicon dioxide nanosphere template, SEM top view of the inverse opal, and a 2D reflection spectrum (when the incident angle is 57.5° and the angle between the detector and the light source is 10°) and the corresponding digital photo (illustration). The scale of the digital photo is 1 cm, the particle size of the silicon dioxide is about 441 nm, the 2D reflection wavelength of the inverse opal under corresponding conditions is about 628 nm, and the thin-film shows red under corresponding conditions.

Figure 10:
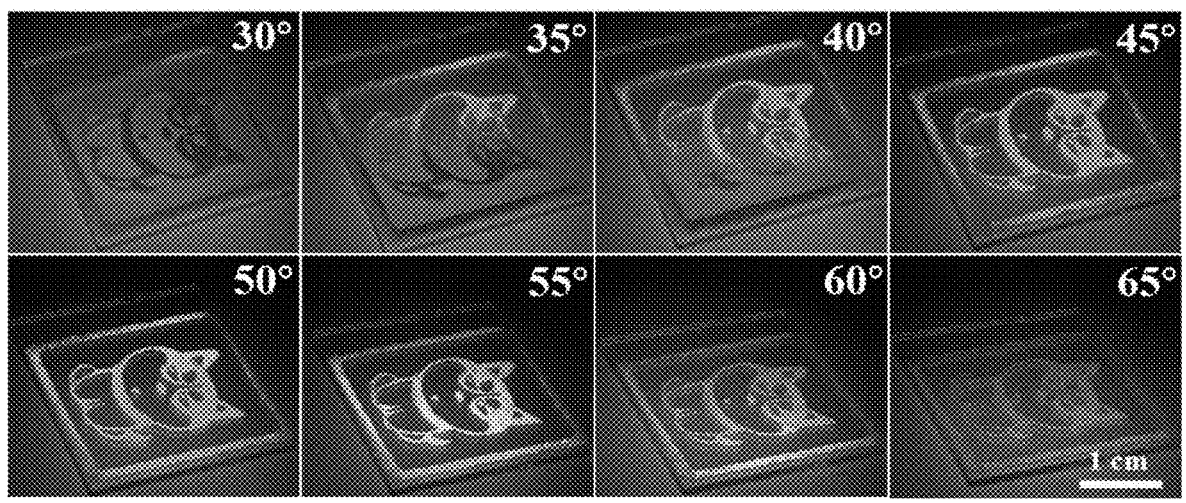

FIG. 10 shows the digital photos of the patterned silicon dioxide template in embodiment 4 with the change of incident angle. The light source and the camera are in the same position, and the incident angles are 30°, 35°, 40°, 45°, 50°, 55°, 60° and 65° respectively. The photos show a change in structural color from blue to red. FIG. 10 indicates that the structural color of the bilayer photonic crystal thin-film has the typical angle dependence of 2D photonic crystal.

Embodiment 5

1. At room temperature, the titanium dioxide opal photonic crystal templates having a particle size of about 395 nm were prepared by pulling and self-assembly. One of the used two templates was pulled for one circulation, having a thickness of 1.44 µm (template B) and the other was pulled for two circulations, having a thickness of 3.61 µm (template A). The two templates were dislocated by 90° and combined, and the polyimide tape was used to separate the two templates into a "sandwich" structure for later use.
2. Ethoxylated trimethylolpropane triacrylate, poly(ethylene glycol) (200) diacrylate, acrylic acid, and tris(3-mercaptopropionic acid) glycerol ester were mixed at a volume ratio of 1:4:1:0.3, and the photoinitiator 1-hydroxycyclohexyl phenyl acetone (184) was added, wherein the volume ratio of the photoinitiator to ethoxylated trimethylolpropane triacrylate was 0.04:1. After ultrasonic dispersion uniformly, the mixture was perfused into the "sandwich" structure templates for ultraviolet light curing. The ultraviolet lamp used for curing is a high-pressure mercury lamp with a power of 800 W and a curing time of 25 s.
3. The outside glass substrates were stripped to obtain the bilayer photonic crystal containing titanium dioxide nanospheres.

When the light source is on the same side as the observer and the incident angle is 57.5°, the structural color of the bilayer photonic crystal is orange.

Figure 11:
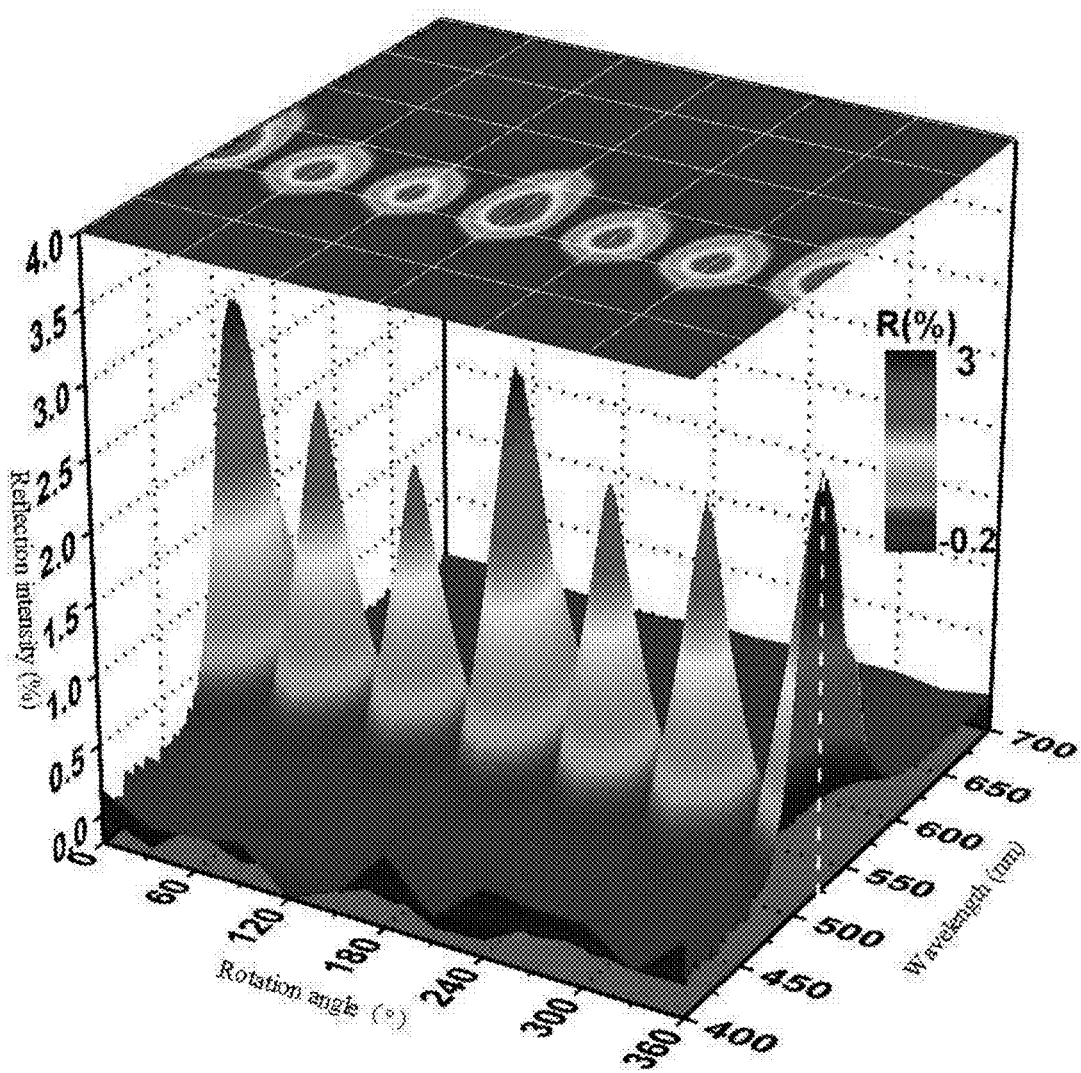

FIG. 11 shows, when observed from the thicker side of the bilayer photonic crystal thin-film containing titanium dioxide nanospheres in Embodiment 5, a variation spectrogram of 2D photonic band gap during the rotation of the bilayer photonic crystal along the thin-film plane for one cycle, wherein the incident angle is 45° and the angle between the detector and the light source is 10°. When the bilayer photonic crystal rotates by 0°, the thin-film displays the structural color of the layer A. After rotating by 30°, the structural color of the layer A disappears and the structural color of the layer B cannot be observed. After rotating by 30° again, the thin-film displays the structural color of the layer A, turning this cycle. For the whole bilayer photonic crystal, the opening-closing period of the structural color is 60°.

Embodiment 6

1. At room temperature, the polystyrene coated with silicon dioxide opal photonic crystal templates having a particle size of about 395 nm were prepared by pulling and self-assembly. One of the used two templates was pulled for one circulation, having a thickness of 1.15 µm (template B), and the other was pulled for two circulations, having a thickness of 2.72 µm (template A). The two templates were dislocated by 90° and combined, and the polyimide tape was used to separate the two templates into a "sandwich" structure for later use.
2. Ethoxylated trimethylolpropane triacrylate, poly(ethylene glycol) (200) diacrylate, acrylic acid, and tris(3-mercaptopropionic acid) glycerol ester were mixed at a volume ratio of 1:4:1:0.25, and the photoinitiator 1-hydroxycyclohexyl phenyl acetone (184) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 30 s.
3. The outside glass substrates were stripped to obtain the bilayer photonic crystal containing polystyrene coated with silicon dioxide nanospheres.

When the light source is on the same side as the observer and the incident angle is 57.5°, the structural color of the bilayer photonic crystal is orange.

Embodiment 7

1. At room temperature, the polymethylmethacrylate coated with silicon dioxide opal photonic crystal templates having a particle size of about 395 nm were prepared by pulling and self-assembly. One of the used two templates was pulled for one circulation, having a thickness of 1.18 µm (template B, which was pulled for one circulation and recorded as template 1B), and the other was pulled for two circulations, having a thickness of 2.53 µm (template A, which was pulled for two circulations and recorded as template 2A). The two templates were dislocated by 90° and combined, and the polyimide tape was used to separate the two templates into a "sandwich" structure for later use.
2. Ethoxylated trimethylolpropane triacrylate, poly(ethylene glycol) (200) diacrylate, acrylic acid, and tris(3-mercaptopropionic acid) glycerol ester were mixed at a volume ratio of 1:4:2:0.25, and the photoinitiator 2-hydroxy-2-methyl-1-phenyl-1-acetone (1173) was added, wherein the volume ratio of the photoinitiator to ethoxylated trimethylolpropane triacrylate was 0.03:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 50 s.
3. The outside glass substrates were stripped to obtain the bilayer photonic crystal containing polymethylmethacrylate coated with titanium dioxide nanospheres.

When the light source is on the same side as the observer and the incident angle is 57.5°, the structural color of the bilayer photonic crystal is orange.

Embodiment 8

1. At room temperature, the cadmium sulfide opal photonic crystal templates having a particle size of about 395 nm were prepared by pulling and self-assembly. One of the used two templates was pulled for one circulation, having a thickness of 1.34 µm (template B), and the other was pulled for two circulations, having a thickness of 2.67 µm (template A). The two templates were dislocated by 90° and combined, and the polyimide tape was used to separate the two templates into a "sandwich" structure for later use.

2. Ethoxylated trimethylolpropane triacrylate, poly(ethylene glycol) (200) diacrylate, acrylic acid, and bis(3-mercaptopropionic acid) glycol ester were mixed at a volume ratio of 1:4:1:0.1, and the photoinitiator 2-hydroxy-2-methyl-1-phenyl-1-acetone (1173) was added, wherein the volume ratio of the photoinitiator to ethoxylated trimethylolpropane triacrylate was 0.03:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 10 s.

3. The outside glass substrates were stripped to obtain the bilayer photonic crystal containing cadmium sulfide nanospheres.

When the light source is on the same side as the observer and the incident angle is 57.5°, the structural color of the bilayer photonic crystal is orange.

Embodiment 9

1. At room temperature, the silicon dioxide opal photonic crystal templates having a particle size of about 395 nm were prepared by pulling and self-assembly. One of the used two templates was pulled for one circulation, having a thickness of 1.24 µm (template B, which was recorded as template 1B due to being pulled for one circulation), and the other template was pulled for two circulations, having a thickness of 2.01 µm (template A, which was recorded as template 2A due to being pulled for two circulations). The two templates were dislocated by 90° and combined, and the polyimide tape was used to separate the two templates into a "sandwich" structure for later use.

2. Ethoxylated trimethylolpropane triacrylate, poly(ethylene glycol) (200) diacrylate, acrylic acid, and tetra(3-mercaptopropionic acid) pentaerythritol ester were mixed at a volume ratio of 1:4:2:0.25, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 20 s.

3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

FIG. 9a shows a SEM cross-sectional view of the inverse opal corresponding to the bilayer inverse opal photonic crystal template A in embodiment 9, having a thickness of about 1.24 FIG. 9b shows a SEM cross-sectional view of the inverse opal corresponding to the bilayer inverse opal photonic crystal template B in embodiment 9, having a thickness of about 2.01 µm.

Figure 12A:
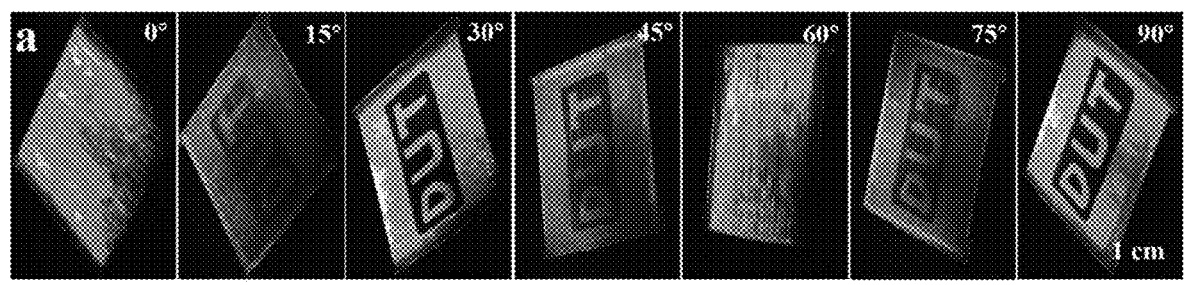
Figure 12B:
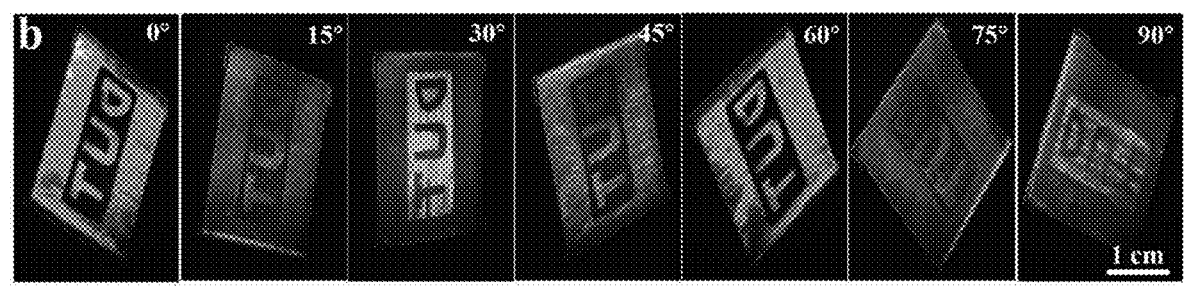

FIG. 12a shows a digital photo of the bilayer photonic crystal thin-film rotating by 90° when observed from the thinner side of the bilayer photonic crystal thin-film in embodiment 9. The light source and the camera are in the same position, the incident angle is about 50°, and the photo is taken by every 15°. The photos show that the bilayer photonic crystal has brilliant structural color when rotating by 0°, 30°, 60° and 90°, but no structural color at other rotation angles. FIG. 12b shows digital photos of the bilayer photonic crystal thin-film rotating during 90° when observed from the thicker side of the bilayer photonic crystal thin-film in embodiment 9. The light source and the camera are in the same position, the incident angle is about 50°, and the photo is taken by every 15°. The photos show that the bilayer photonic crystal has brilliant structural color when rotating by 0° and 60°, but no structural color at other rotation angles.

Comparative Example 2

1. At room temperature, the silicon dioxide opal photonic crystal templates having a particle size of about 395 nm were prepared by pulling and self-assembly. One of the used two templates was pulled for one circulation, having a thickness of 1.24 µm (template B, which was recorded as template 1B due to being pulled for one circulation), and the other was a glass plate without silicon dioxide opal photonic crystal (was recorded as template 0A without template). The two templates were dislocated by 90° and combined, and the polyimide tape was used to separate the two templates into a "sandwich" structure for later use.

2. Ethoxylated trimethylolpropane triacrylate, poly(ethylene glycol) (200) diacrylate, acrylic acid, and tetra(3-mercaptopropionic acid) pentaerythritol ester were mixed at a volume ratio of 1:4:1:0.25, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 20 s.

3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide template.

FIG. 9a shows a SEM cross-sectional view of the inverse opal corresponding to the bilayer inverse opal photonic crystal template 1B in comparative embodiment 2, having a thickness of about 1.24 µm.

Comparative Example 3

1. At room temperature, the silicon dioxide opal photonic crystal templates having a particle size of about 395 nm were prepared by pulling and self-assembly. The two used templates were both pulled for one circulation, both having a thickness of 1.24 µm (template B and template A were recorded as template 1B and template 1A due to being pulled for one circulation). The two templates were dislocated by 90° and combined, and the polyimide tape was used to separate the two templates into a "sandwich" structure for later use.

2. Ethoxylated trimethylolpropane triacrylate, poly(ethylene glycol) (200) diacrylate, acrylic acid, and tetra(3-mercaptopropionic acid) pentaerythritol ester were mixed at a volume ratio of 1:4:1:0.25, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 20 s.

3. The outside glass substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

FIG. 9a shows a SEM cross-sectional view of the inverse opal corresponding to the bilayer inverse opal photonic crystal templates 1A and 1B in comparative embodiment 3, having a thickness of about 1.24 μm.

Embodiment 10

1. At room temperature, the silicon dioxide opal photonic crystal templates having a particle size of about 395 nm were prepared by pulling and self-assembly. One of the used two templates was pulled for one circulation, having a thickness of 1.24 μm (template B, which was recorded as template 1B due to being pulled for one circulation), and the other was pulled for three circulations, having a thickness of 2.77 μm (template A, which was recorded as template 3A due to being pulled three circulations). The two templates were dislocated by 90° and combined, and the polyimide tape was used to separate the two templates into a "sandwich" structure for later use.

2. Ethoxylated trimethylolpropane triacrylate, poly(ethylene glycol) (200) diacrylate, acrylic acid, and tetra(3-mercaptopropionic acid) pentaerythritol ester were mixed at a volume ratio of 1:4:1:0.25, and the photoinitiator 2-hydroxy-2-methyl-1-phenyl-1-acetone (1173) was added, wherein the volume ratio of the photoinitiator to ethoxylated trimethylolpropane triacrylate was 0.02:1. After ultrasonic dispersion uniformly, the mixture was perfused into the "sandwich" structure templates for ultraviolet light curing. The ultraviolet lamp used for curing is a high-pressure mercury lamp with a power of 1000 W and a curing time of 20 s.

3. The outside substrates were stripped to obtain the bilayer photonic crystal containing silicon dioxide nanospheres. The bilayer inverse opal photonic crystal thin-film was prepared by immersing the obtained bilayer photonic crystal with 5% hydrofluoric acid to remove the silicon dioxide templates.

Figure 9C:
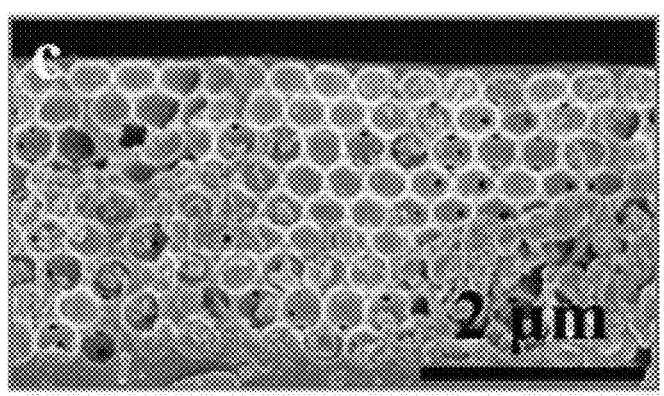

FIG. 9a shows a SEM cross-sectional view of the inverse opal corresponding to the bilayer inverse opal photonic crystal template 1A in embodiment 10, having a thickness of about 1.24 μm. FIG. 9c shows a SEM cross-sectional view of the inverse opal corresponding to the bilayer inverse opal photonic crystal template 3B in embodiment 10, having a thickness of about 2.77 μm.

Figure 1:
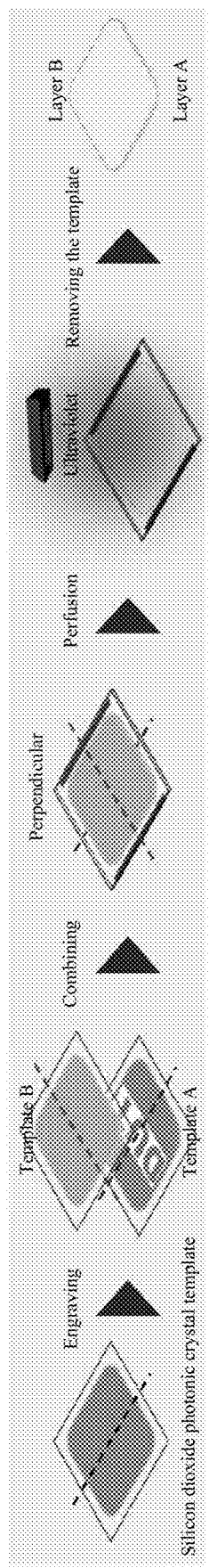
Figure 2:
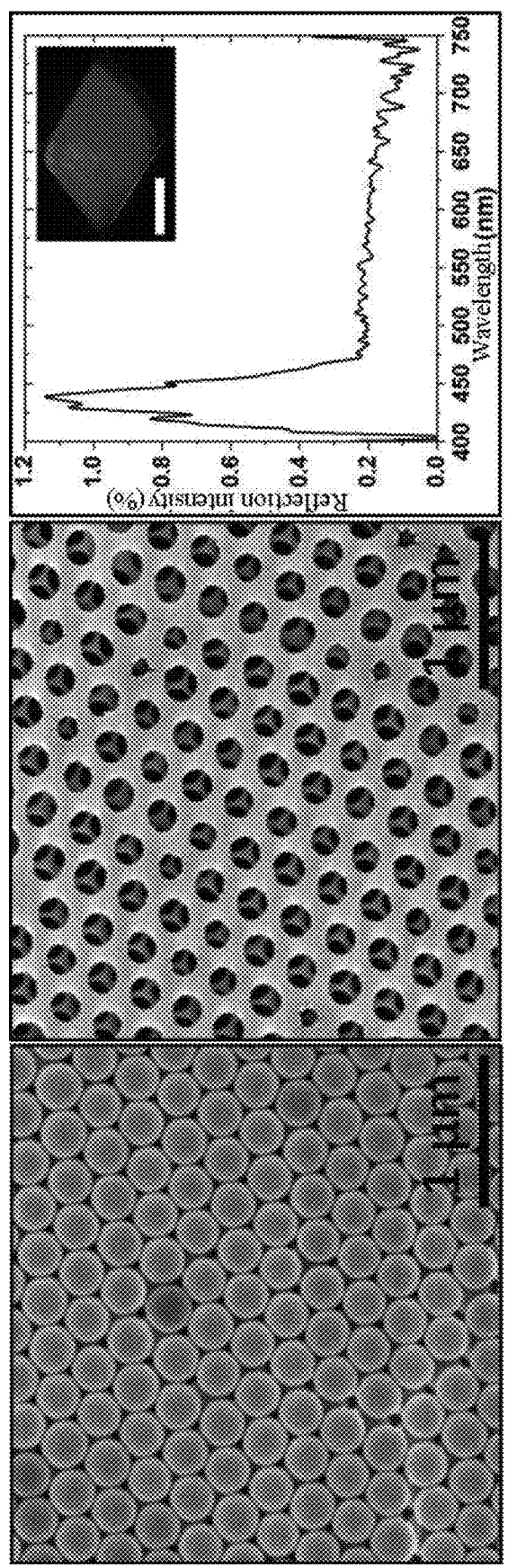
Figure 3:
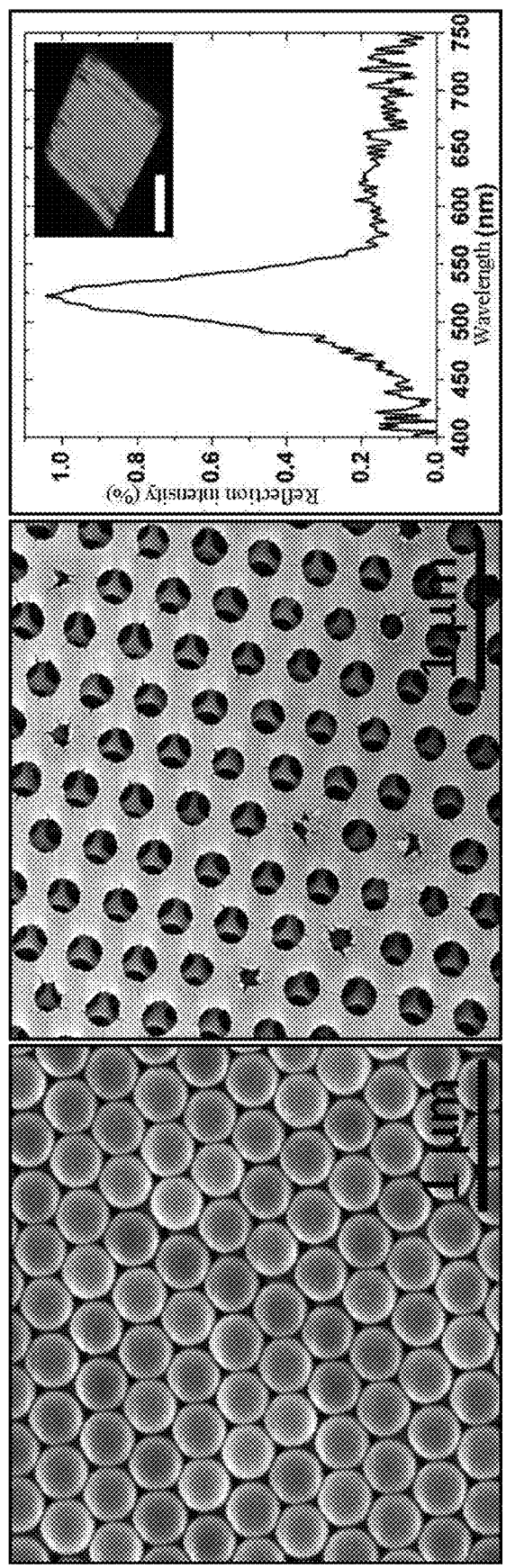
Figure 4:
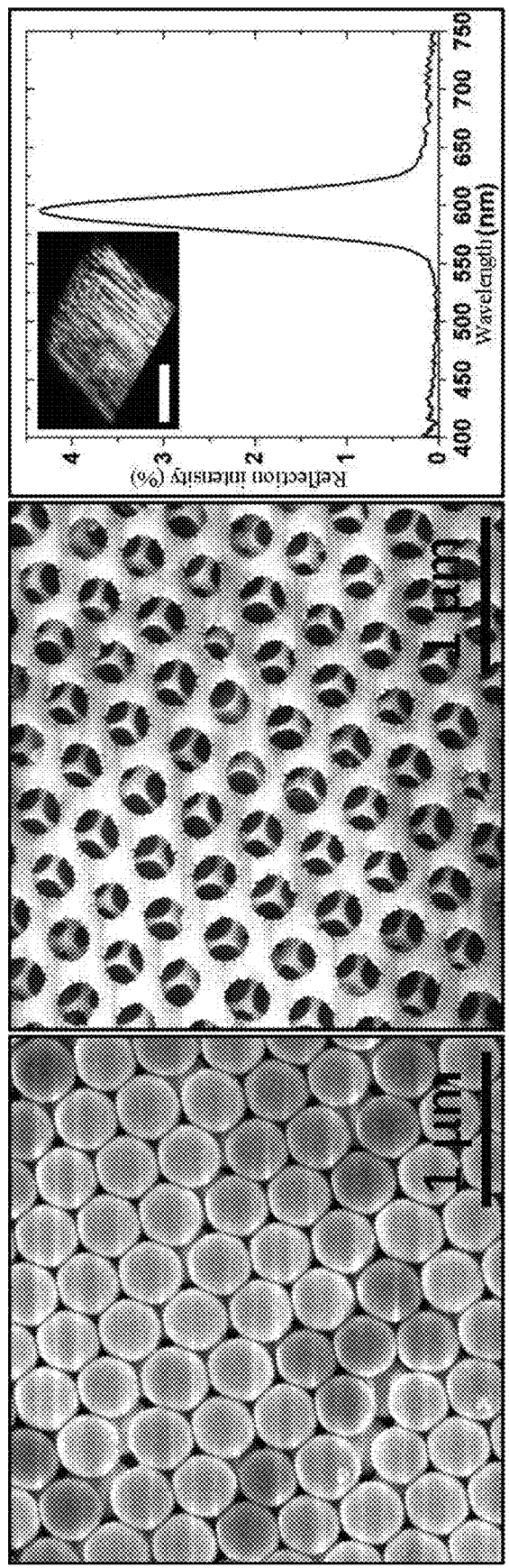
Figure 13A:
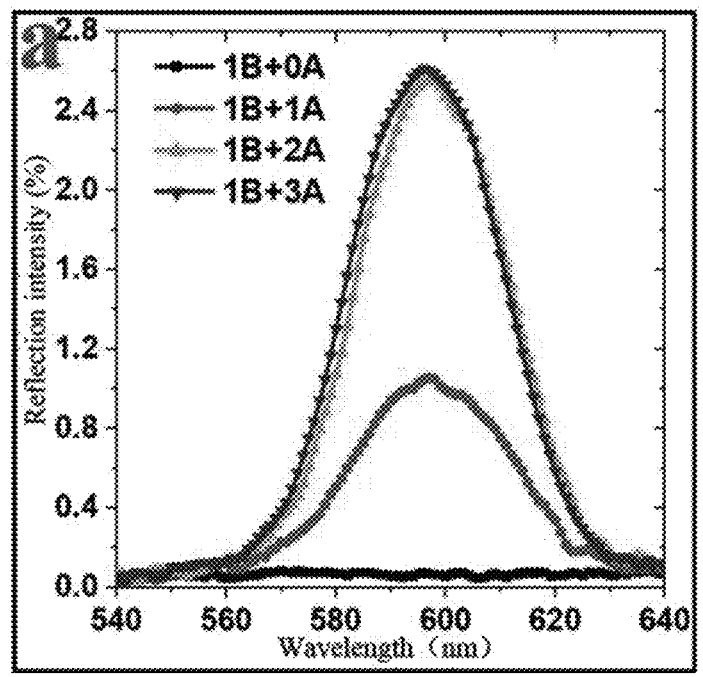
Figure 13B:
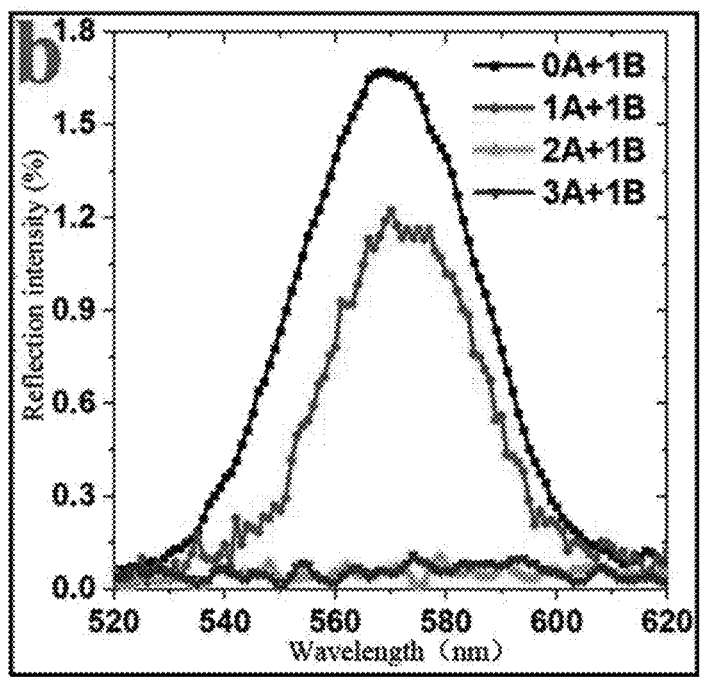

FIG. 13a shows, when observed from the thinner side of the bilayer photonic crystal thin-film, in Embodiment 9 and Comparative Examples 2 and 3 and Embodiment 10, a relationship between the 2D reflection spectrum of the bottom layer and the thickness of the bottom layer when the incident angle is 57.5° and the angle between the detector and the light source is 10°, wherein, "1B+0A" represents the reflection intensity of the layer A measured from the layer B in Comparative Example 2, "1B+1A" represents the reflection intensity of the layer A measured from the layer B in Comparative Example 3, "1B+2A" represents the reflection intensity of the layer A measured from the layer B in Embodiment 9, and "1B+3A" represents the reflection intensity of the layer A measured from the layer B in Embodiment 10. The reflection intensity of the bottom layer increases with the thickness of the bottom layer. When the thickness of the bottom layer is greater than 2 the reflection intensity of the bottom layer is close to a peak. When the thickness continues to increase, the increase of the reflection intensity is not obvious. FIG. 13b shows, when observed from the thinner side of the bilayer photonic crystal thin-film, in Embodiment 9 and Comparative Examples 2 and 3 and Embodiment 10, the relationship between the 2D reflection spectrum of the bottom layer and the thickness of the top layer when the incident angle is 57.5° and the angle between the detector and the light source is 10°, wherein, "0A+1B" represents the reflection intensity of the layer B measured from layer A in Comparative Example 2, "1A+1B" represents the reflection intensity of the layer B measured from the layer A in Comparative Example 3, "2A+1B" represents the reflection intensity of layer B measured from layer a in Embodiment 9, and "3A+1b" represents the reflection intensity of the layer B measured from the layer A in Embodiment 10. The reflection intensity of the bottom layer decreases gradually with the increase of the thickness of the top layer. When the thickness of the top layer is greater than 2 μm the 2D reflected light intensity of the bottom layer is close to 0. 0A represents that template A is not used when preparing bilayer photonic crystals according to the process shown in FIG. 1, and a clean glass plate is used instead of template A. 1A represents that, when preparing bilayer photonic crystals according to the process shown in FIG. 1, the template A is pulled for one circulation, to name a few. 1B represents that, when preparing the bilayer photonic crystal according to the process shown in FIG. 1, the template B is pulled for one circulation.

For those skilled in the art, without departing from the scope of the technical solution of the present disclosure, many possible changes and modifications can be made to the technical solution of the present disclosure by using the technical contents disclosed above, or modified into equivalent embodiments with equivalent changes. Therefore, any simple modification, equivalent change and modification made to the above embodiments according to the technical essence of the present disclosure without departing from the technical solution of the present disclosure shall still belong to the protection scope of the technical solution of the present disclosure.

The invention claimed is:

1. A bilayer photonic crystal photoswitch thin-film device, comprising two opal photonic crystal templates with different thicknesses and a flexible polymer thin-film material, wherein the templates are assembled by nanospheres and combined by perpendicular dislocation into a "sandwich" structure, and the flexible polymer thin-film material is prepared by copolymerization of a precursor solution under an action of ultraviolet light, wherein the precursor solution is prepared by acrylic acid and esters thereof, mercaptoacrylates and photoinitiator; wherein, by rotating the bilayer photonic crystal photoswitch thin-film along a horizontal direction of the bilayer photonic crystal photoswitch thin-film, opening and closing of two periodically controllable optical paths of 30° and 60° are realized.

2. The bilayer photonic crystal photoswitch thin-film device according to claim 1, wherein a boundary value of the two opal photonic crystal templates with different thicknesses ranges from 1 to 6 μm.

3. The bilayer photonic crystal photoswitch thin-film device according to claim 1, wherein the nanospheres are silicon dioxide, titanium dioxide, polystyrene coated with silicon dioxide or titanium dioxide, polymethylmethacrylate coated with silicon dioxide or titanium dioxide, poly (styrene-methyl methacrylate-acrylic acid) polymer colloidal nanospheres coated with silicon dioxide or titanium dioxide, titanium dioxide coated with silicon dioxide, silicon dioxide coated with titanium dioxide, chromic oxide or zinc oxide; wherein each of the two opal photonic crystal templates is obtained by pulling and assembling the nanospheres.

4. The bilayer photonic crystal photoswitch thin-film device according to claim 1, wherein a diameter of each of the nanospheres ranges from 250 to 550 nm.

5. The bilayer photonic crystal photoswtich thin-film device according to claim 1, wherein the acrylic acid and esters thereof comprise triacrylates, diacrylatesoracrylic acids, wherein a volume ratio of the triacrylates, diacrylates and acrylic acids ranges from (0.1 to 6):(0.1 to 6):(0.1 to 6).

6. The bilayer photonic crystal photoswtich thin-film device according to claim 1, wherein the mercaptoacrylates is selected from one of tetra (3-mercaptopropionic acid) esters, tris (3-mercaptopropionic acid) esters and di (3-mercaptopropionic acid) esters; wherein a volume ratio of the mercaptoacrylates to the triacrylate ranges from 0.1-1:1.

7. The bilayer photonic crystal photoswitch thin-film device according to claim 1, wherein the photoinitiator is selected from one or two of 2-oxhydryl-2-methyl-1-phenyl-1-acetone, 1-oxhydrylcyclohexyl phenyl acetone, 2-methyl-1-(4-methylthiophenyl)-2-morpholine-1-acetone, 2-benzyl-2-dimethylamino-1-(4-morpholinephenyl) butanone, phenyl bis (2,4, 6-trimethylbenzoyl) phosphine oxide, benzoin dimethyl ether, and benzoin diethyl ether, wherein a volume ratio of the photoinitiator to the triacrylate class ranges from 0.01-0.05:1.

8. A method for preparing the bilayer photonic crystal photoswitch thin-film device according to claim 1, comprising following steps:
   S1. preparing, at room temperature, a plurality of nanosphere opal photonic crystal templates on a glass substrate by pulling and self-assembly;
   S2. combining, in dislocation manner by 90°, two of the plurality of nanosphere opal photonic crystal templates with different thicknesses, and separating the two templates by a polyimide tape to form a "sandwich" structure;
   S3. mixing the triacrylates, diacrylates, acrylic acids, mercaptoacrylates and photoinitiator, and perfusing, after ultrasonic dispersion uniformly, the mixture into the templates of the "sandwich" structure obtained in step S2 for ultraviolet light curing; and
   S4. stripping the outside glass substrates to obtain a bilayer photonic crystal containing nanospheres.

9. The method for preparing the bilayer photonic crystal photoswitch thin-film device according to claim 8, wherein the nanospheres in the bilayer photonic crystal containing nanospheres obtained in the Step S4 are retained or removed.

10. The method for preparing the bilayer photonic crystal photoswitch thin-film device according to claim 8, wherein in step S1, each of the plurality of nanosphere opal photonic crystal templates is mechanically engraved to obtain a patterned template.

* * * * *